United States Patent
Clark et al.

(10) Patent No.: US 8,990,533 B1
(45) Date of Patent: Mar. 24, 2015

(54) CRASH CONSISTENCY

(71) Applicant: EMC Corporation, Hopkinton, MA (US)

(72) Inventors: Roy E Clark, Hopkinton, MA (US); John S Harwood, Paxton, MA (US); David Cohen, Hull, MA (US)

(73) Assignee: EMC Corporation, Hopkinton, MA (US)

( * ) Notice: Subject to any disclaimer, the term of this patent is extended or adjusted under 35 U.S.C. 154(b) by 281 days.

(21) Appl. No.: 13/684,953

(22) Filed: Nov. 26, 2012

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/16* | (2006.01) | |
| *G06F 17/30* | (2006.01) | |
| *G06F 11/14* | (2006.01) | |

(52) U.S. Cl.
CPC ......... *G06F 12/16* (2013.01); *Y10S 707/99953* (2013.01); *G06F 17/30091* (2013.01); *G06F 11/1471* (2013.01)
USPC ..... 711/165; 711/162; 707/684; 707/999.202

(58) Field of Classification Search
CPC .......... G06F 11/1471; G06F 17/30091; G06F 17/30233; Y10S 707/99953
USPC .................................. 711/162, 165; 707/684
See application file for complete search history.

(56) References Cited

U.S. PATENT DOCUMENTS

| | | | | |
|---|---|---|---|---|
| 2002/0147882 | A1* | 10/2002 | Pua et al. | 711/103 |
| 2005/0132039 | A1* | 6/2005 | Hartung | 709/223 |
| 2005/0268067 | A1* | 12/2005 | Lee et al. | 711/202 |
| 2006/0242369 | A1* | 10/2006 | Thelen | 711/158 |
| 2007/0168707 | A1* | 7/2007 | Kern et al. | 714/6 |
| 2009/0177850 | A1* | 7/2009 | Boyd et al. | 711/155 |
| 2011/0047195 | A1* | 2/2011 | Le et al. | 707/827 |

* cited by examiner

*Primary Examiner* — Ryan Bertram
(74) *Attorney, Agent, or Firm* — Krishnendu Gupta; Joseph D'Angelo

(57) ABSTRACT

A computer implemented method, system, and program product for data consistency comprising establishing a memory-mapped file, enabling the memory-mapped file data to be paged to the non-volatile storage medium, receiving, at a consistency layer, a write IO; wherein the write IO corresponds to a space on the storage medium, issuing a read IO to the storage medium, wherein the read IO corresponds to the space on the storage medium to be overwritten by the write IO, writing the data of the read IO to a undo log and writing the write IO to the storage medium.

20 Claims, 14 Drawing Sheets

CRASH CONSISTENCY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost and density of memory is such that organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

SUMMARY

A computer implemented method, system, and program product for data consistency comprising establishing a memory-mapped file, enabling the memory-mapped file data to be paged to the non-volatile storage medium, receiving, at a consistency layer, a write IO; wherein the write IO corresponds to a space on the storage medium, issuing a read IO to the storage medium, wherein the read IO corresponds to the space on the storage medium to be overwritten by the write IO, writing the data of the read IO to a undo log and writing the write IO to the storage medium.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
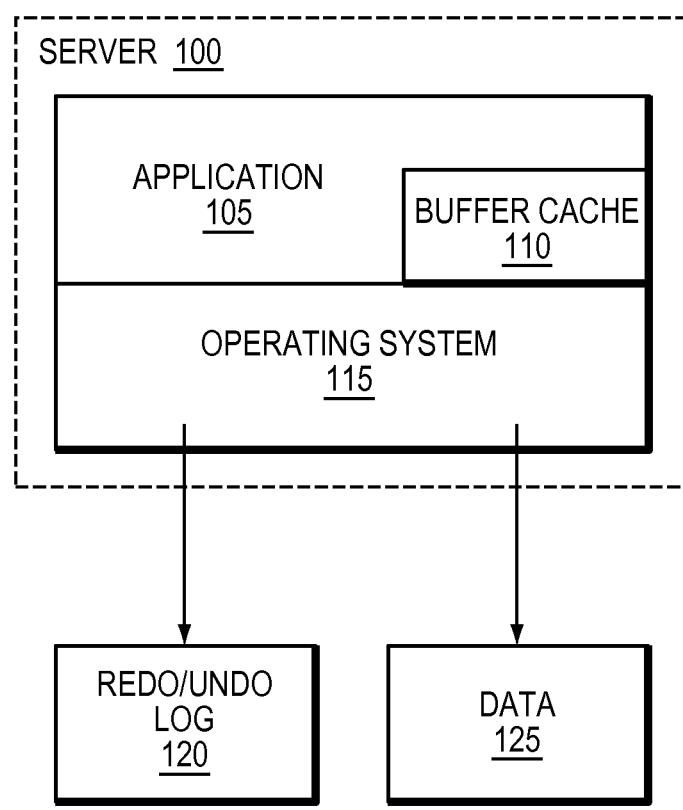
FIG. 1 is a simplified illustration of an application with a buffer cache communicating with an operating system, in accordance with an embodiment of the present disclosure.

Maintaining a crash consistent view of volatile memory containing application data structures is typically done through a persistence layer using undo/redo logging. Conventionally, applications create transactional consistency boundaries by writing log entries that are persisted on storage before new data is written to a structure(s). Generally, upon a server crash/reboot these logs are replayed against a previous checkpoint to reconstruct a consistent view of all data structures at a consistency boundary just prior to the time of the crash.

Conventionally, an undo log may be used to bring the image back to a particular point in time and the redo log may then be applied to that image. Typically, this eliminates an exposure of losing dirty data contained in volatile memory. Conventional memory techniques for greatly expanding the effective size of volatile memory, such as a memory mapped files may be available to a typical database. However, generally the database may have no visibility to how the memory mapped file is maintained and whether, following a crash, a consistent image is available. Typically, the database continues to use a combination of undo and redo logs as described herein.

In some embodiments, the current disclosure may enable utilizing an operating system memory mapped file facility, a non-volatile flash storage medium and a service exposed to an application which manages and creates persistent, crash consistent checkpoints of a memory-mapped file. In certain embodiments, a service or device may manage undo logging at runtime and undo replay at restart or reboot time. In at least some embodiments, an application may maintain a redo log to be applied to the checkpoint. In most embodiments, the current disclosure may enable a crash-consistent non-volatile address space to be made available to an application. In certain embodiments, an application may not need to manage a buffer cache. In further embodiments, an application may manage a redo log and a device or service may transparently manage the undo log. In at least some embodiments, the storage domain may be mapped into the load/store memory domain. In some embodiments, the memory of the server may be extended through the use of flash. In further embodiments, memory extended to flash or another nonvolatile storage medium may be used to create crash-consistent storage.

The following terms may be useful in understanding one or more embodiments presented herein:

MMAP—may stand for a memory-mapped file. A memory-mapped file may be a segment of virtual memory which has been assigned a direct byte-for-byte correlation with some portion of a file or file-like resource. Typically, this resource may be a file that is physically present on a non-volatile storage medium. A correlation between the file and the memory space may permit applications to treat the mapped portion as if it were primary memory. Mmap is generally a method of memory-mapped file I/O. Conventionally, it relies on demand paging, because initially file contents may not be entirely read from disk into physical RAM. Generally, the actual reads from disk are performed in an on-demand manner, after a specific location is accessed. Using conventional techniques, if a memory-mapped file crashes, there may be no way to know whether or not the memory-mapped file is consistent because dirty portions may not have been written to the file on storage. Thus, following a typical crash, a conventional memory-mapped file may not provide a consistent image for an application.

DIRTY PAGES—may be memory pages in a buffer or page cache that have been modified and need to be written back to a storage device BUFFER CACHE—may be a cache of application data including clean and dirty pages maintained by the application PAGE CACHE—may be a cache of pages including clean and dirty pages that the OS maintains which are copies of data located on a storage device LOG SYNC—may be a point in time where an application desires to create a point in time from where data can be recovered to a consistent state representing this point in time if needed MSYNC—may refer to a method for synchronizing the in-memory image of a file with the file content on-disk by writing out the dirty pages to storage.

IOCTL—(generally refers to an abbreviation of input/output control) may be a system call for device-specific input/output operations and other operations which may not be expressed by regular system calls. An ioctl may be used to tell a log device to discard log entries and start over. This instruction may be communicated in a variety of ways, of which Ioctl is an example.

PAGING may be a memory-management scheme where a computer may store and retrieve data from secondary storage for use in main memory. Typically, in some paging memory-management schemes, the operating system may retrieve data from secondary storage in same-size blocks called pages so that the physical address space of a process may not need to be contiguous. Conventionally, paging may be an implementation of virtual memory enabling the use of disk or other non-volatile storage for data that does not fit into volatile storage. Generally, paging-in of pages may occur when a program tries to access a page not in RAM; conventionally, this is called a page fault and the OS may determine the location of the data in auxiliary storage and load the data into a page in RAM. Usually, the page may be put in an empty slot or non-empty slot. If the data in that slot has been modified since it was read into RAM (i.e., if it had become "dirty"), it may be written back, or paged-out to its location in secondary storage before being freed.

In certain embodiments, the current disclosure may enable a methodology to assist a redo log and may facilitate a new type of storage device and Operating System (OS) interaction. In certain embodiments, an OS may push dirty pages to storage. In some embodiments, dirty pages may be intercepted and used to create an undo log. In at least some embodiments, an undo log may save information and enable an image to be reconstructed to create memory at an earlier point in time. In most embodiments, a database or application may create a checkpoint. In certain embodiments, a database or application may maintain a redo log.

In certain embodiments, the current disclosure may extend RAM type memory capacity of a server by mapping that capacity to a flash device. In some embodiments, a memory-mapped file may be a method to extend the memory capacity of a server. In a particular embodiment, a memory-mapped file may enable a terabyte of flash memory to be mapped into a database application space. In certain embodiments, load and store accesses that an application believes is going to memory may be indirectly going to and from flash. In most embodiments, an OS may be handling paging data from a flash device into RAM memory. In certain embodiments, a file on a local PCIE flash device or SSD device, or on a array disk, but cached through the PCIE flash device, may be memory mapped. In certain embodiments, as memory mapping conventionally engages a demand paging system in an OS, the effective size of primary memory as seen by an application may be larger than the available DRAM in the system. Generally, with a memory mapped file, an operating system handles paging the virtual memory space.

For example, refer to the example embodiment of FIG. 1. In the example embodiment of FIG. 1, application 105 is running on server 100 and has buffer cache 110. Application 105 is interacting with operating system 115 to perform IO. Operating system 115 writes data to redo/undo log 120 and writes data to data 125 as requested by application 115.

Figure 2:
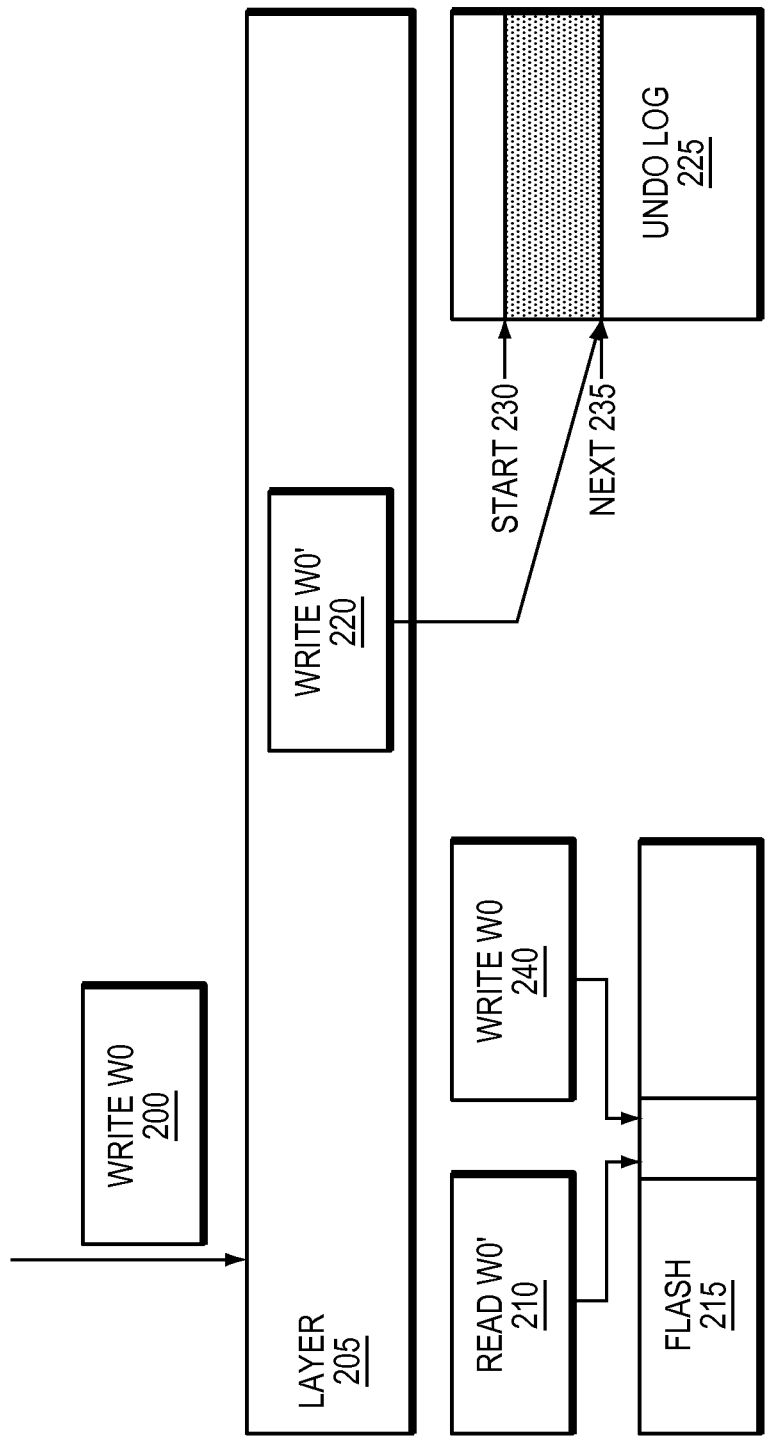
FIG. 2 is a simplified illustration of a device performing a logging function in response to receiving a write command, in accordance with an embodiment of the present disclosure.
Figure 3:
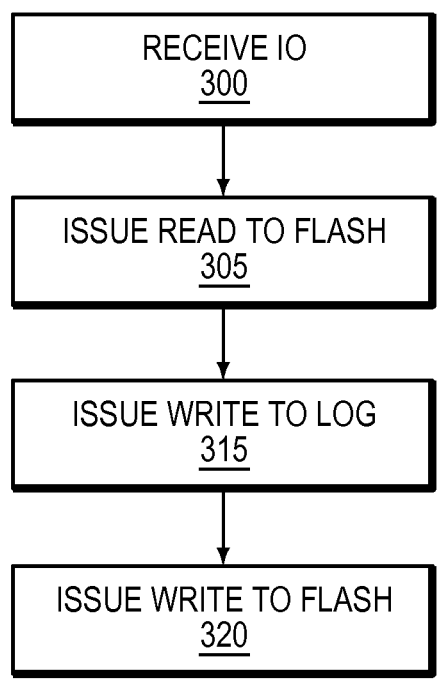
FIG. 3 is a simplified example of a method for responding to an IO received at a device, in accordance with an embodiment of the present disclosure.

Refer now to the example embodiments of FIGS. 2 and 3, Layer 205 receives write W0 200 (step 300). Layer 205 issues Read W0' 210 to flash 215 (step 305). Read W0' 210 corresponds to the point in Flash 215 that Write W0 200 is to overwrite. Layer 205 writes Write W0' 220 (step 315), which corresponds to the data of Read W0' 210, to Undo log 225. Undo Log 225 has a start 230 and a next 235. Start 230 corresponds to the start of the undo log since a last checkpoint was taken. Next 235 corresponds to where the next write should occur in undo log 225. Following write W0' 220 in undo log 225, the next 235 may be advanced. Layer 205 writes Write W0 240 to flash 215 (step 320). In some embodiments a layer, such as layer 205, may be connected to the undo log (225) via a fiber channel or ISCI connection. In other embodiments a layer, such as layer 205, may be connected to flash (215) via local PCIE to a flash card, a local SSD, a fiber channel or ISCI connection. In some further embodiments a layer, such as layer 205, may be connected to flash (215) and undo log (225) as exposed through a local caching device.

In most embodiments, a layer, such as layer 205, may wait for acknowledgement that a read W0' 210, Write W0' 220 and Write W0 240 has completed before executing another write W0 200. In at least some embodiments, waiting for an acknowledgement may ensure data consistency.

Figure 4:
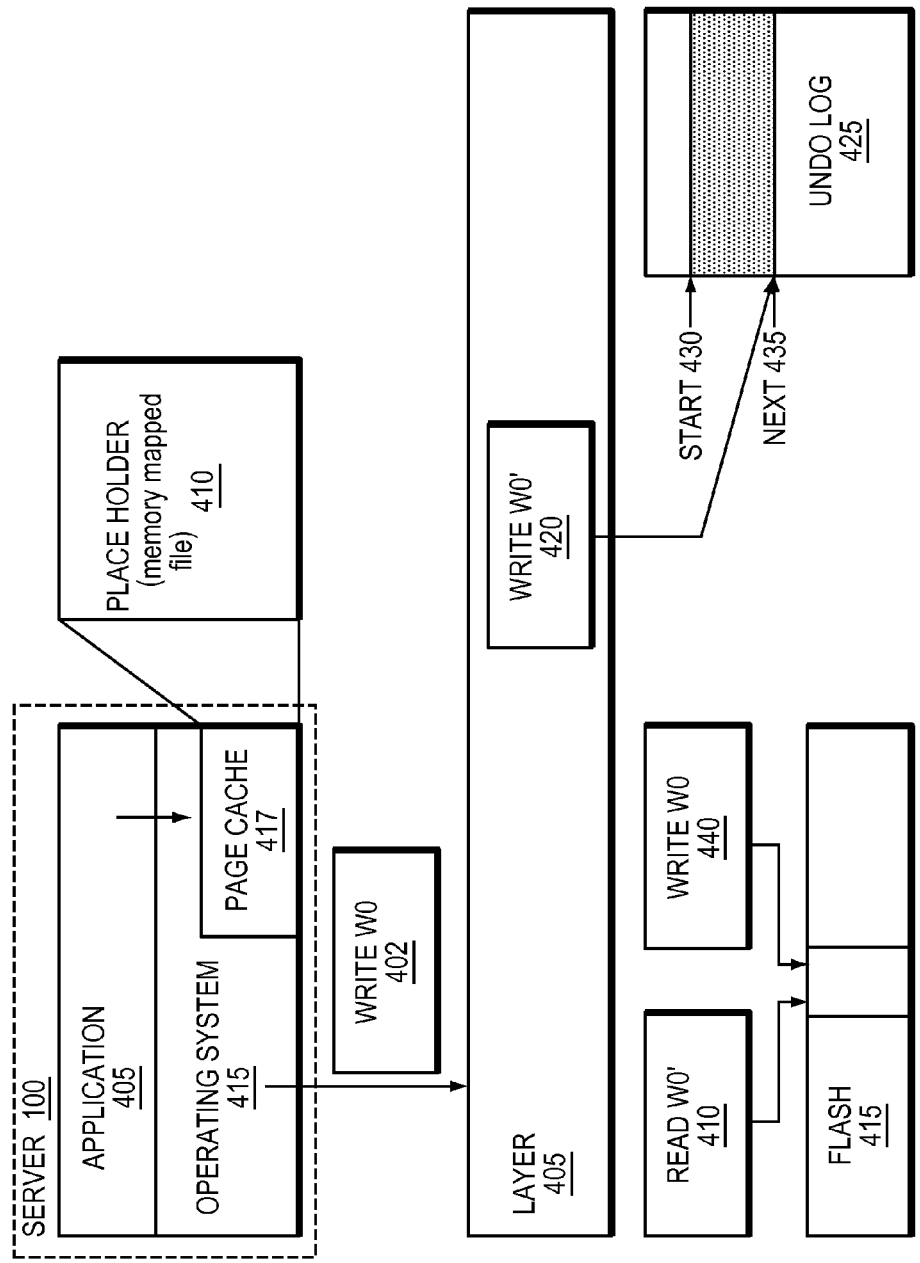
FIG. 4 is a simplified illustration of an application writing information to a memory mapped file and a device responding to IO, in accordance with an embodiment of the present disclosure.
Figure 5:
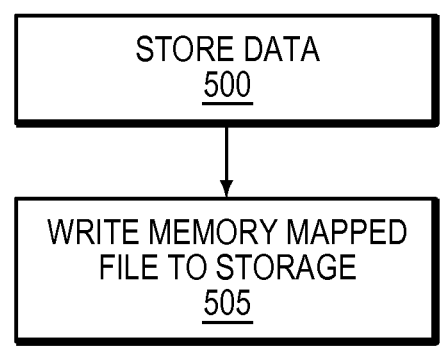
FIG. 5 is a simplified example of a method for writing data to a memory mapped file to storage, in accordance with an embodiment of the present disclosure.

For example, refer to the example embodiments of FIGS. 4 and 5. In the example embodiment of FIG. 4, application 405 is running on server 400. Application 405 is storing data, within Place holder 410, in this embodiment a memory mapped file (step 500). In this embodiment, the Operating system 415 handles paging to and from the virtual memory space or placeholder 410 into physical memory containing the page cache (417). Placeholder 410 is in turn mapped to flash 415 via operating system 415. Operating system 415 has page cache 417 and occasionally writes IO, such as Write W0 402, from page cache (417) to layer 405 (step 505). Layer 405 appears to operating system 415 as a storage device, which in some embodiments may be a flash card. Application 405 may not need a buffer cache.

Layer 405 receives write W0 402. Layer 405 issues Read W0' 410 to flash 415. Read W0' 410 corresponds to the point in Flash 415 that Write W0 402 is to overwrite. Layer 405 writes Write W0' 420, which corresponds to the data of Read W0' 410, to Undo log 425. Undo Log 425 has a start 430 and a next 435. Start 430 corresponds to the start of the undo log since a last checkpoint was taken. Next 435 corresponds to where the next write should occur in undo log 425. Following write W0' 420 in undo log 425, the next 435 may be advanced. Layer 405 writes Write W0 440 to flash 415.

Figure 6:
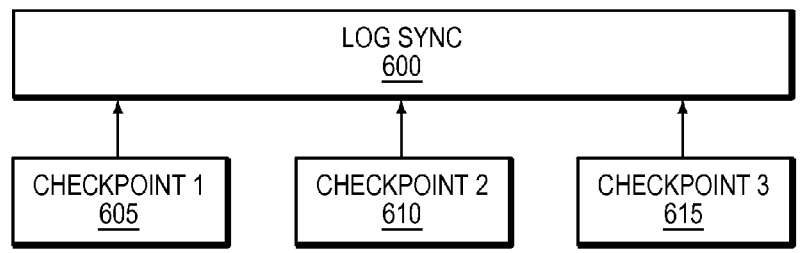
FIG. 6 is a simplified illustration of a series of checkpoints in an undo log, in accordance with an embodiment of the present disclosure.
Figure 7:
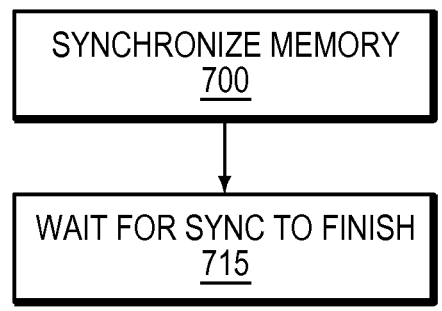
FIG. 7 is a simplified example of a method for synchronizing memory, in accordance with an embodiment of the present disclosure.

Refer now to the example embodiments of FIGS. 6 and 7. FIG. 6 illustrates and example log synchronization 600. Log Sync 600 has checkpoints 1 605, checkpoint 2 610, and checkpoint 3 616. A synchronize memory command occurs (step 700), which writes dirty pages from page cache (417) to storage. In certain embodiments the synchronization may occur through the use of a msync command. The system waits for the synchronization to finish (step 715), which indicates that all the dirty pages in memory has been written to the storage. In this embodiment, once the writing has finished, a new consistent checkpoint may be created.

In most embodiments, when a checkpoint occurs, an OS may take old dirty pages that have been modified and may write them out to what the OS thinks is a memory mapped file. In some embodiments, after issuing a msync, an ioltc may be issued to determine that an OS has written all the information and the undo log (425) has been initialized. In certain embodiments, after the ioltc comes back completed, a database may have created a checkpoint and everything may have been written to the flash.

Figure 8:
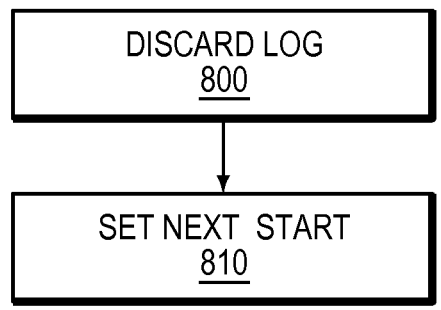
FIG. 8 is a simplified example of a method for starting a new log checkpoint, in accordance with an embodiment of the present disclosure.

Refer now to the example embodiments of FIGS. 4 and 8. In the embodiment, the old log 425 may be discarded (step 800). A new log start may be indicated by moving start 430 to next 435 of undo log 425 (step 810).

Figure 9:
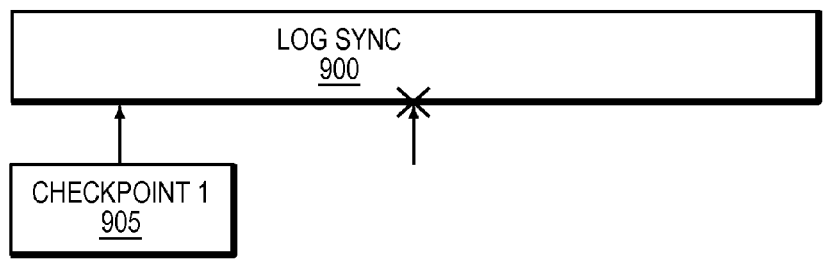
FIG. 9 is a simplified illustration of a crash after checkpoint in an undo log, in accordance with an embodiment of the present disclosure.
Figure 10:
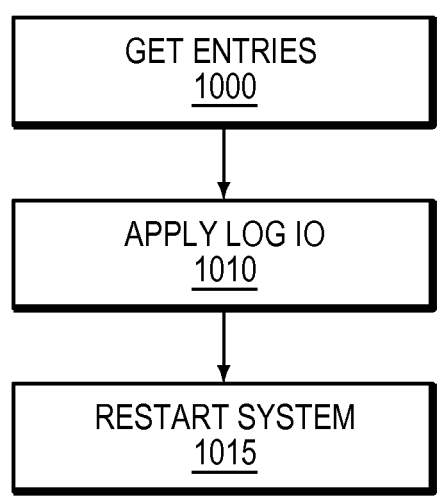
FIG. 10 is a simplified example of a method for rolling back to a checkpoint by applying IO in an undo log, in accordance with an embodiment of the present disclosure.

Refer now to the example embodiments of FIGS. 9 and 10. In the example embodiment of FIG. 9, checkpoint 1 905 exists in log synch 900. At point in time 915, a crash occurs. To point in time 915, data has been written to a log, such as undo log 425 of FIG. 4. To roll the image back to a consistent point in time, log entries entered since checkpoint 905 is used (step 1000). IO is applied from the log synchronization (step 1010). The system is restarted with the revised image (step 1015).

Figure 11:
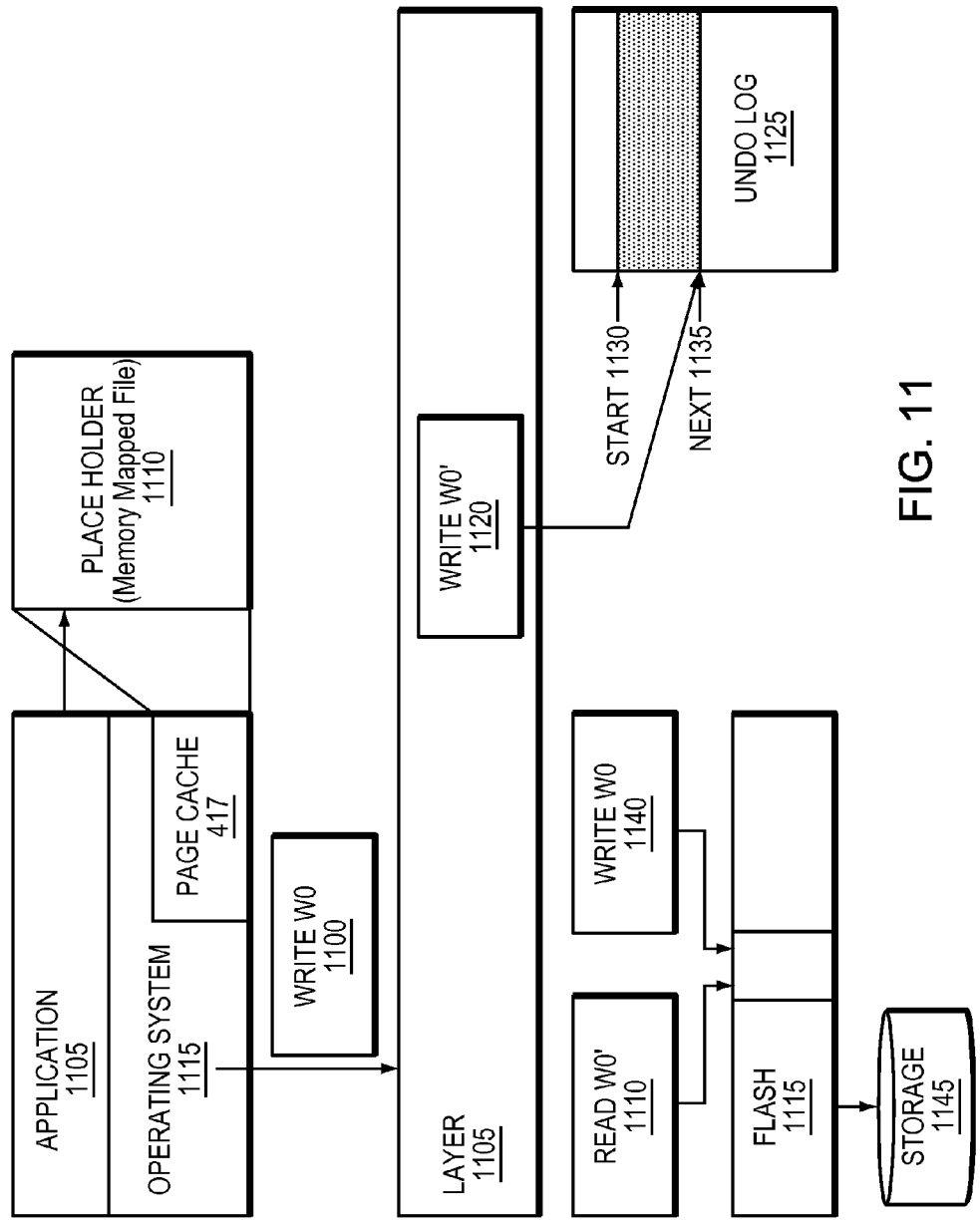
FIG. 11 is a simplified illustration of an application writing information to a memory mapped file and a device responding to IO, where that IO is written to flash and transferred to storage, in accordance with an embodiment of the present disclosure.
Figure 12:
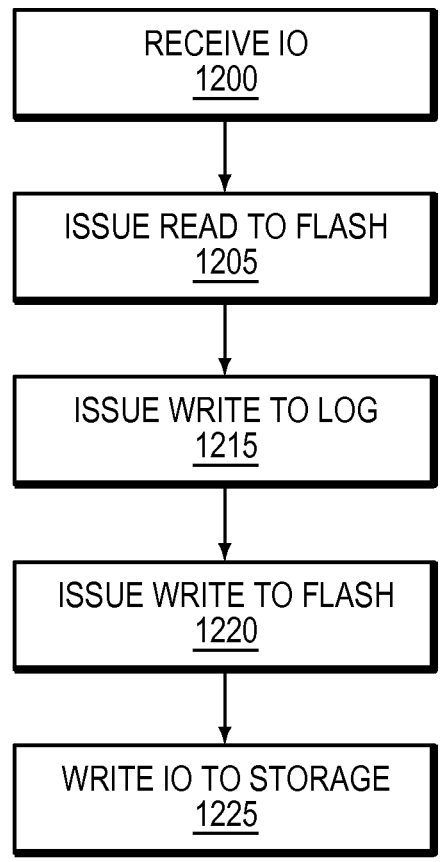
FIG. 12 is a simplified example of a method for writing IO to storage, in accordance with an embodiment of the present disclosure.

Refer now to the example embodiments of FIGS. 11 and 12. Layer 1105 receives write W0 1100 (step 1200). Layer 1105 issues read W0' 1110 to flash 1115 (step 1205). Layer 1105 issues write W0' 1120 to Undo log 1125 (step 1215). Layer 1105 issues write W0 1140 to flash 1115 (step 1220). Write W0 1140 is written from flash 1115 to storage 1145 (step 1225).

Figure 13:
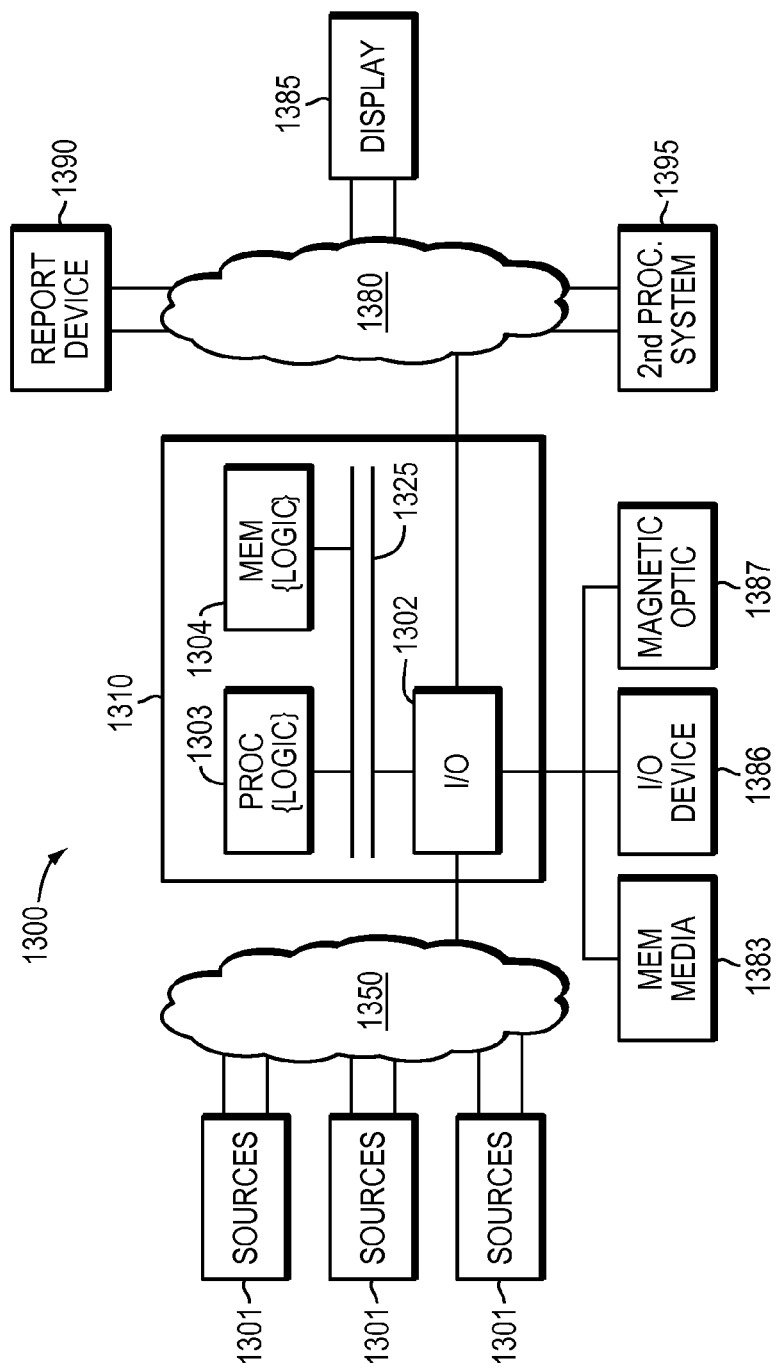
FIG. 13 is an example of an embodiment of an apparatus that may utilize the techniques described herein, in accordance with an embodiment of the present disclosure.
Figure 14:
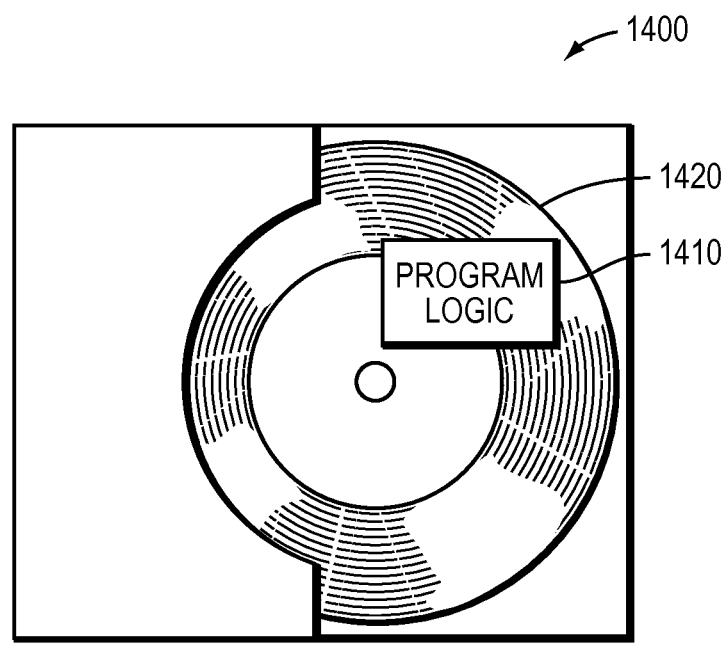
FIG. 14 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor 1303 to provide a unique apparatus that operates analogously to specific logic circuits. As such a general purpose digital machine can be transformed into a special purpose digital machine. FIG. 14 shows Program Logic 1634 embodied on a computer-readable medium 1430 as shown, and wherein the Logic is encoded in computer-executable code configured for carrying out the reservation service process of this invention and thereby forming a Computer Program Product 1400. The logic 1434 may be the same logic 1340 on memory 1304 loaded on processor 1303. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIG. 5, FIG. 7 and FIG. 10. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A system for data consistency, the system comprising:
a consistency layer;
a non-volatile storage medium;
an undo log;
a server;
a memory-mapped file facility;
and
  computer-executable logic operating in memory, wherein the computer-executable program logic is configured to enable one or more processors to execute:
establishing a memory-mapped file;
enabling the memory-mapped file data to be paged to the non-volatile storage medium;
receiving, at the consistency layer, a write IO; wherein the write IO corresponds to a space on the storage medium; wherein the consistency layer appears to the server to be a memory mapped file;
issuing a read IO to the storage medium, wherein the read IO corresponds to space on the storage medium to be overwritten by the write IO;
writing the data of the read IO to the undo log; and
writing the write IO to the storage medium.

2. The system of claim 1 wherein the storage medium is flash.

3. The system of claim 1 further comprising an Operating System and wherein the consistency layer receives IO from the operating system.

4. The system of claim 1 further comprising an application wherein the computer logic is further configured to enable one or more processor to execute:
running a synchronization command on the memory-mapped file, in response to a checkpoint request from the application; wherein the synchronization commands saves the current copy of data in an memory-mapped file to the undo log.

5. The system of claim 4 wherein the synchronization commands writes the dirty data in the memory-mapped file to the non-volatile storage.

6. The system of claim 4 wherein the undo log has a start location and a next location and wherein the computer logic is further configured to enable one or more processor to execute:
moving the start and the next location in response to the dirty data being written to the undo log.

7. A computer program product for use in ensuring consistency comprising:
a non-transitory computer readable medium encoded with computer executable program code for replication of data, the code configured to enable the execution of:
program logic is configured to enable one or more processors to execute:
establishing a memory-mapped file;
enabling the memory-mapped file data to be paged to the non-volatile storage medium;
receiving, at a consistency layer, a write IO; wherein the write IO corresponds to a space on the storage medium; wherein the consistency layer appears to a server to be a memory mapped file;
issuing a read IO to a storage medium, wherein the read IO corresponds to space on the storage medium to be overwritten by the write IO;
writing the data of the read IO to an undo log; and
writing the write IO to the storage medium.

8. The computer program product of claim 7 wherein the storage medium is flash.

9. The computer program product of claim 7 wherein the consistency layer receives IO from an operating system.

10. The computer program product of claim 7 wherein the code is further configured to enable:
running a synchronization command on the memory-mapped file, in response to a checkpoint request from the application; wherein the synchronization commands saves the current copy of data in an memory-mapped file to the undo log.

11. The computer program product of claim 10 wherein the synchronization commands writes the dirty data in the memory-mapped file to the non-volatile storage.

12. The computer program product of claim 10 wherein the undo log has a start location and a next location and wherein the code is further configured to enable:
moving the start and the next location in response to the dirty data being written to the undo log.

13. A computer implemented method for data consistency comprising;
establishing a memory-mapped file;
enabling the memory-mapped file data to be paged to the non-volatile storage medium;
receiving, at a consistency layer, a write IO; wherein the write IO corresponds to a space on the storage medium; wherein the consistency layer appears to a server to be a memory mapped file;
issuing a read IO to the storage medium, wherein the read IO corresponds to the space on the storage medium to be overwritten by the write IO;
writing the data of the read IO to a undo log; and
writing the write IO to the storage medium.

14. The computer implemented method of claim 13 wherein the storage medium is flash.

15. The computer implemented method of claim 13 wherein the consistency layer receives IO from an operating system.

16. The computer implemented method of claim 13 further comprising:
running a synchronization command on the memory-mapped file, in response to a checkpoint request from the application; wherein the synchronization commands saves the current copy of data in an memory-mapped file to the undo log.

17. The computer implemented method of claim 16 wherein the synchronization commands writes the dirty data in the memory-mapped file to the non-volatile storage.

18. The computer implemented method of claim 16 wherein the undo log has a start location and a next location and wherein the code is further configured to enable:
moving the start and the next location in response to the dirty data being written to the undo log.

19. The computer program product of claim 7 wherein the code is further configured to enable reconstructing a memory state at an earlier point in time.

20. The computer implemented method of claim 13 wherein the computer logic is further configured to enable one or more processor to execute reconstructing a memory state at an earlier point in time.

* * * * *